F. Zunkeler.
Turning Bungs.
N°44,267.    Patented Sep.13, 1864.
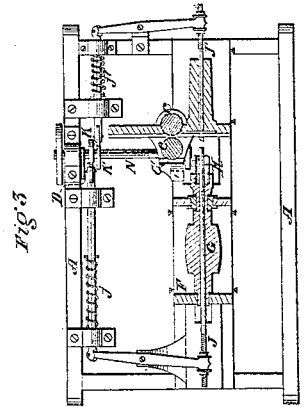
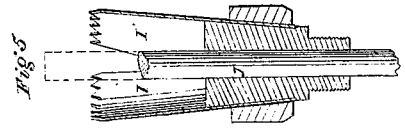
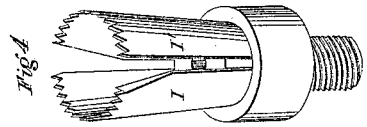
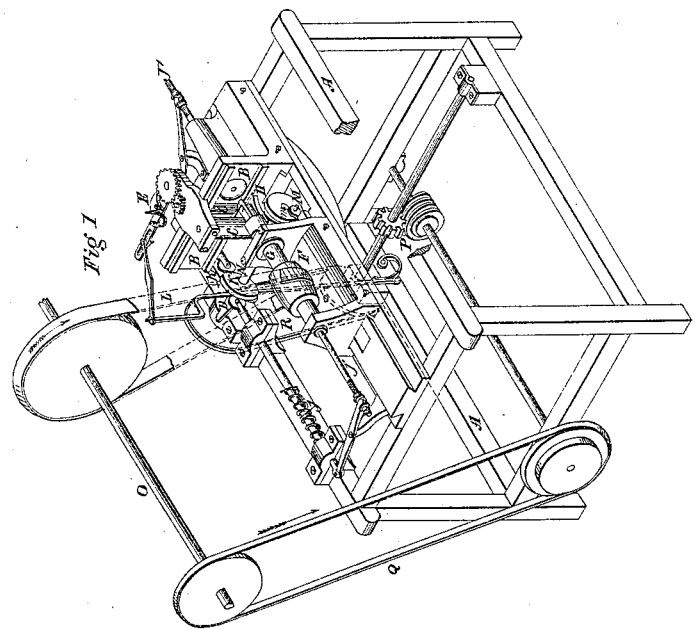
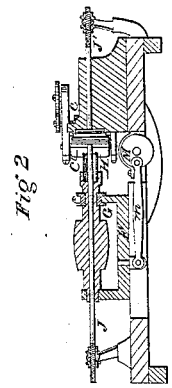
Witnesses:
Inventor:

UNITED STATES PATENT OFFICE.

FERDINAND ZÜNKELER, OF CINCINNATI, OHIO, ASSIGNOR TO HIMSELF AND FREDERICK SCHULTZE, OF SAME PLACE.

IMPROVEMENT IN MACHINES FOR CUTTING BUNGS.

Specification forming part of Letters Patent No. 44,267, dated September 13, 1864.

*To all whom it may concern:*

Be it known that I, FERDINAND ZÜNKELER, of Cincinnati, in the county of Hamilton and State of Ohio, have invented a new and useful Machine for Making Wooden Bungs; and I do hereby declare the following to be a full, clear, and exact description thereof, reference being had to the accompanying drawings, making part of this specification.

My invention relates to an automatic contrivance for the manufacture of tapered wooden bungs.

Figure 1 is a perspective view of a machine embodying my improvements. Figs. 2 and 3 are, respectively, a vertical and a horizontal axial section through the cutter and its accessories. Figs. 4 and 5 are, respectively, a perspective view and an axial section of the cutter on an enlarged scale.

A is the frame which supports the various operative parts. The stuff is fed in along a guide-channel, B, between a pressure-roller, C', and an intermittent feed-roller, C, operated by a rotating cam, D, through the medium of a ratchet movement, E.

F is a sliding head-stock, in which is journaled the shaft G of the bit or cutter H, which consists of two flaring or conical serrated blades, I I', (corresponding to the desired flare of the bung,) whose interior surfaces serve to "slick" or burnish the sides of the bung in the very act of separation.

J J' are two clamps, which, at the proper instant, are simultaneously advanced by the cams K K', so as to seize and hold the stuff between them while the cutter operates upon it. The cutter H is rotated continuously by means of the belt L from the drive-shaft O. The cutter head-stock F being connected by a pitman, m, to a wrist, M, on the end of cam-shaft N, is advanced at the proper moment to make a bung and again retracted, so as to leave the latter in the grasp of the clamps J J', which now escaping from their cams and being retracted by the springs j j', the liberated bung then drops out of the machine, and, the feed-motion returning its action, the process is repeated. The motion of the cam-shaft N, I derive from a worm-movement, P, which is connected by bands Q and R with the same shaft O which drives the cutter.

I claim herein as new and of my invention—

1. The arrangement of guide-channel B, intermittent feed-rollers C C', rotating and sliding cutter H, and intermittent clamps J J', with their described or equivalent accessories, the whole being combined and operating substantially as set forth.

2. While disclaiming the general principle of cutting bungs with a conical saw, I claim the construction of the conical cutter I I', with one or more slits or cutting-edges by which it is adapted to shave or slick the periphery of the bung in the act of cutting.

In testimony of which invention I hereunto set my hand.

FERD. ZÜNKELER.

Witnesses:
 GEO. H. KNIGHT,
 FREDERICK SCHULTZE.